US011397955B2

(12) United States Patent
Ohnemus et al.

(10) Patent No.: US 11,397,955 B2
(45) Date of Patent: *Jul. 26, 2022

(54) SYSTEM AND METHOD FOR ESTIMATING CO2 EMISSION

(71) Applicant: Refinitiv US Organization LLC, New York, NY (US)

(72) Inventors: Peter Ohnemus, Herrliberg (CH); Christopher Greenwald, Baar (CH); Peter Pircher, Baar (CH)

(73) Assignee: Refinitiv US Organization LLC, New York, NY (US)

(*) Notice: Subject to any disclaimer, the term of this patent is extended or adjusted under 35 U.S.C. 154(b) by 170 days.

This patent is subject to a terminal disclaimer.

(21) Appl. No.: 16/657,566

(22) Filed: Oct. 18, 2019

(65) Prior Publication Data

US 2020/0118144 A1 Apr. 16, 2020

Related U.S. Application Data

(63) Continuation of application No. 15/452,511, filed on Mar. 7, 2017, now Pat. No. 10,489,793, which is a continuation of application No. 14/060,242, filed on Oct. 22, 2013, now Pat. No. 9,613,331, which is a continuation of application No. 13/629,186, filed on
(Continued)

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/06* | (2012.01) |
| *G06Q 10/08* | (2012.01) |

(Continued)

(52) U.S. Cl.
CPC ........... *G06Q 30/018* (2013.01); *G06Q 10/06* (2013.01); *G06Q 10/067* (2013.01); *G06Q 10/06393* (2013.01); *G06Q 10/10* (2013.01); *G06Q 30/0282* (2013.01); *G06Q 50/18* (2013.01)

(58) Field of Classification Search
CPC .. G06Q 30/018; G06Q 50/18; G06Q 30/0282; G06Q 10/06; G06Q 10/067; G06Q 10/10; G06Q 10/06393
USPC .................................. 705/1.1–912, 317, 347
See application file for complete search history.

(56) References Cited

U.S. PATENT DOCUMENTS

| | | |
|---|---|---|
| 6,975,975 B2 | 12/2005 | Fasca |
| 7,277,864 B2 | 10/2007 | Ohnemus et al. |

(Continued)

*Primary Examiner* — Jonathan P Ouellette
(74) *Attorney, Agent, or Firm* — Norton Rose Fulbright US LLP

(57) ABSTRACT

Estimations of carbon dioxide ("CO2") emission of an entity upon the condition of incomplete or missing data uses one or more algorithms implemented in a machine having a processor and a memory and data concerning the entity. The data is applied to an algorithm implemented as code executable in the processor. The algorithm produces a result that comprises an estimate of the CO2 emission of the entity. The CO2 emission estimate can be output to a user, and the underlying formula and data can inspected and optionally modified by users with suitable permissions. The CO2 emission estimate can be applied as a factor in a formula to compute a rating for the entity which can be output from the machine. Error estimates associated with the data used by the algorithm can be generated to provide improved estimates.

20 Claims, 8 Drawing Sheets

Related U.S. Application Data

Sep. 27, 2012, now Pat. No. 8,645,151, which is a continuation of application No. 12/702,593, filed on Feb. 9, 2010, now Pat. No. 8,321,234.

(60) Provisional application No. 61/152,591, filed on Feb. 13, 2009.

(51) Int. Cl.
*G06Q 30/00* (2012.01)
*G06Q 50/18* (2012.01)

(56) References Cited

U.S. PATENT DOCUMENTS

| | | | |
|---|---|---|---|
| 2003/0028527 A1 | 2/2003 | Crosby et al. | |
| 2004/0093264 A1 | 5/2004 | Shimizu | |
| 2005/0021389 A1* | 1/2005 | Dias | G06Q 40/02 705/7.39 |
| 2007/0224085 A1* | 9/2007 | Tooley | G01N 1/22 422/68.1 |
| 2008/0183523 A1* | 7/2008 | Dikeman | G06Q 10/06395 705/7.41 |
| 2008/0306801 A1 | 12/2008 | Musier et al. | |
| 2010/0211518 A1 | 8/2010 | Ohnemus et al. | |

\* cited by examiner

Data Points

Code: En_En_ER_DP023 (2007)  Title: CO2 Equivalents Emission Total
Total CO2 and CO2 equivalents emission in tonnes.
Value: 74200000
Raw data:

| | |
|---|---|
| Title: | BP SUSTAINABILITY REPORT 2007-Environment |
| Page number | 36 |
| URL | http://www.bp.com/liveassets/bp_internet/globalbp/STAGING/global_assets/downloads/bp_sust... |
| Publisher / Author: | BP PLC/NF |
| Scope: | Global |
| Publication date: | 2008-05-31 |
| Textual data: | Five-year performance data 2003 2004 2005 2006 2007 Environment of Direct carbon dioxide (CO) in 12 (million tonnes) 78.5 76.8 73.2 59.3 59.2 Indirect carbon dioxide (COim1{C) (million tonnes) 10.4 9.9 13.9 10.1 10.7 Direct methane (CH14) (million tonnes) 0.24 0.23 0.23 0.24 0.20 Direct greenhouse gas (GHG) 1 (million tonnes CO2 equivalent) 83.4 81.7 78.0 64.4 63.5 Flaring (exploration and production) (thousand tonnes of hydrocarbons) 1,342 1,343 1,5141,241 1,124 Sulphur dioxide (SO2) (thousand tonnes) 151 126 124 106 99 Nitrogen oxides (NOX) (thousand tonnes) 220 215 218 198 204 d Quantitative performance indicators have been chosen, with external input, to reflect the most important sustainability issues for BP. Data is reported here only from operations under BP management control, except in footnote 1. We use consistent processes that seek to provide acceptable estimates to enable year-to-year comparisons. e DAFWCF, RIF are the annual frequency for 200,000 hours worked. Prior to 2003, data included both illness and injuries. From 2003, only injuries are reported. f 2008 DAFWCF, RIF and contractor hours worked here have been corrected from 0.083, 0.047 and 244 respectively. h Direct GHG emissions are the physical emissions from BP's sources. Indirect GHG emissions are a consequence of the import by BP of steam and electricity from third-party sources. I BP share of emissions from operations on equity-share bases. TNK-BP emissions are not included. J Prior to 2005, reported indirect emissions are lower because the BP CO2 protocol previously allowed credit for exported power. |
| Comment: | Total CO2 Emissions = Direct CO2 emissions + Indirect CO2 emissions = 63500000 + 10700000 = 74200000 tonnes |

Fig. 7

SYSTEM AND METHOD FOR ESTIMATING CO2 EMISSION

CROSS-REFERENCE TO RELATED APPLICATIONS

The present application is a continuation of U.S. patent application Ser. No. 15/452,511 filed Mar. 7, 2017 and entitled "SYSTEM AND METHOD FOR ESTIMATING CO2 EMISSION," which is a continuation of U.S. patent application Ser. No. 14/060,242 filed Oct. 22, 2013 and entitled "SYSTEM AND METHOD FOR ESTIMATING RATING CRITERIA VALUES," issued Apr. 4, 2017 as U.S. Pat. No. 9,613,331, which is a continuation of U.S. patent application Ser. No. 13/629,186 filed Sep. 27, 2012 and entitled "CO2 ESTIMATOR MODULE," issued Feb. 4, 2014 as U.S. Pat. No. 8,645,151, which is a continuation of U.S. patent application Ser. No. 12/702,593 filed Feb. 9, 2010 and entitled "SYSTEM AND METHOD FOR ESTIMATING CO2 EMISSION," issued Nov. 27, 2012 as U.S. Pat. No. 8,321,234, which claims the benefit of priority from U.S. Provisional Application No. 61/152,591, filed Feb. 13, 2009 and entitled "SYSTEM INCLUDING CO2 EMISSION ESTIMATOR MODULE," the disclosures of which are incorporated herein by reference in their entirety.

FIELD OF THE INVENTION

The present invention concerns the rating and benchmarking of companies using extrafinancial information such as environmental data. More particularly, carbon dioxide emission data is estimated using a programmed machine and automatically presented through an interface in the absence of data on this topic for the current reporting period or when complete information is not available.

BACKGROUND OF THE INVENTION

Depending on the sector and the company, CO2 emission data may be available in a timely manner, or may not be available at all. Across a spectrum of companies, the range of information disclosed and available through corporate documents and to news reporting services can vary from thorough to partial to none. When such data is available, it can be compiled (e.g., its components can be weighted) and presented as a value that is useful in rating a company relative to its peers. U.S. Pat. No. 7,277,864, assigned to the present assignee, describes rating systems that can accommodate such extra-financial data, when present. However, improvements are needed in the art to address circumstances that are all too common in which incomplete or non-existent data provides no value for rating an entity such as a company. The present invention addresses this problem using heuristics that provide multiple models for estimating CO2 total emission and for providing, automatically, an estimated value when a reported value is not available.

SUMMARY OF THE INVENTION

In accordance with one aspect of the invention, a method for outputting a rating based upon an estimate of a carbon dioxide emission of an entity is implemented in a machine having a processor and a memory. According to this aspect, data is received at the machine concerning the entity. The data is applied to an algorithm implemented as code executable in the processor. The algorithm produces a result that comprises an estimate of the carbon dioxide emission of the entity. The carbon dioxide emission estimate is applied as a factor in a formula to compute a rating for the entity. The rating is output from the machine.

In accordance with another aspect of the invention, a method for estimating a carbon dioxide emission of an entity is implemented in a machine having a processor and a memory. In this method, data as described above is received at the machine and applied to a code-implemented algorithm that produces an estimate of the carbon dioxide emission of the entity. The estimated carbon dioxide emission is the output from the machine.

Methods in accordance with further, optional aspects of the invention can have the algorithm apply data concerning an industry, sector, or sub-sector to which the entity belongs. Also, methods in accordance with further optional aspects can have the data that is applied to the algorithm include both qualitative and quantitative data. Also, optionally, the estimated carbon dioxide emission can be made available to a user through a user interface, and, if so, can be a result of operation of a data-fault module executing in the machine, that makes the estimated carbon dioxide emission value available if the entity is determined to have missing or incomplete carbon dioxide emission data. In addition, more than one algorithm can be applied to the data so as to provide discrete estimates of the carbon dioxide emission from each algorithm that are combined with one another, such as, by way of example, a simple average.

Another, optional feature of a method in accordance with the invention can include the additional steps of computing an error associated with the algorithm(s) by applying the algorithm(s) to at least one additional entity having a known carbon dioxide emission, and calculating a difference between the estimated carbon dioxide emission for the additional entity and the known carbon dioxide emission. Any calculated difference can be used to correct for error in the estimated carbon dioxide emission for the entity.

In a further aspect, methods as described above can be further arranged to permit users, through a user-interface, to customize the algorithm(s).

In still a further aspect of the invention, a computer-implemented system combines plural modules that cooperate to output a carbon dioxide emission estimate in the absence of data or when complete data is not available for a given period (e.g., year). The carbon dioxide emission estimate can be calculated in connection with the operation of a rating program or system and utilized to supply a value or values that are used in the calculation of a rating for an entity and so on.

These and other features, aspects and advantages of the invention can be appreciated from the following Description of Certain Embodiments of the Invention and the accompanying Drawing Figures.

DESCRIPTION OF THE DRAWING FIGURES

Figure 6:
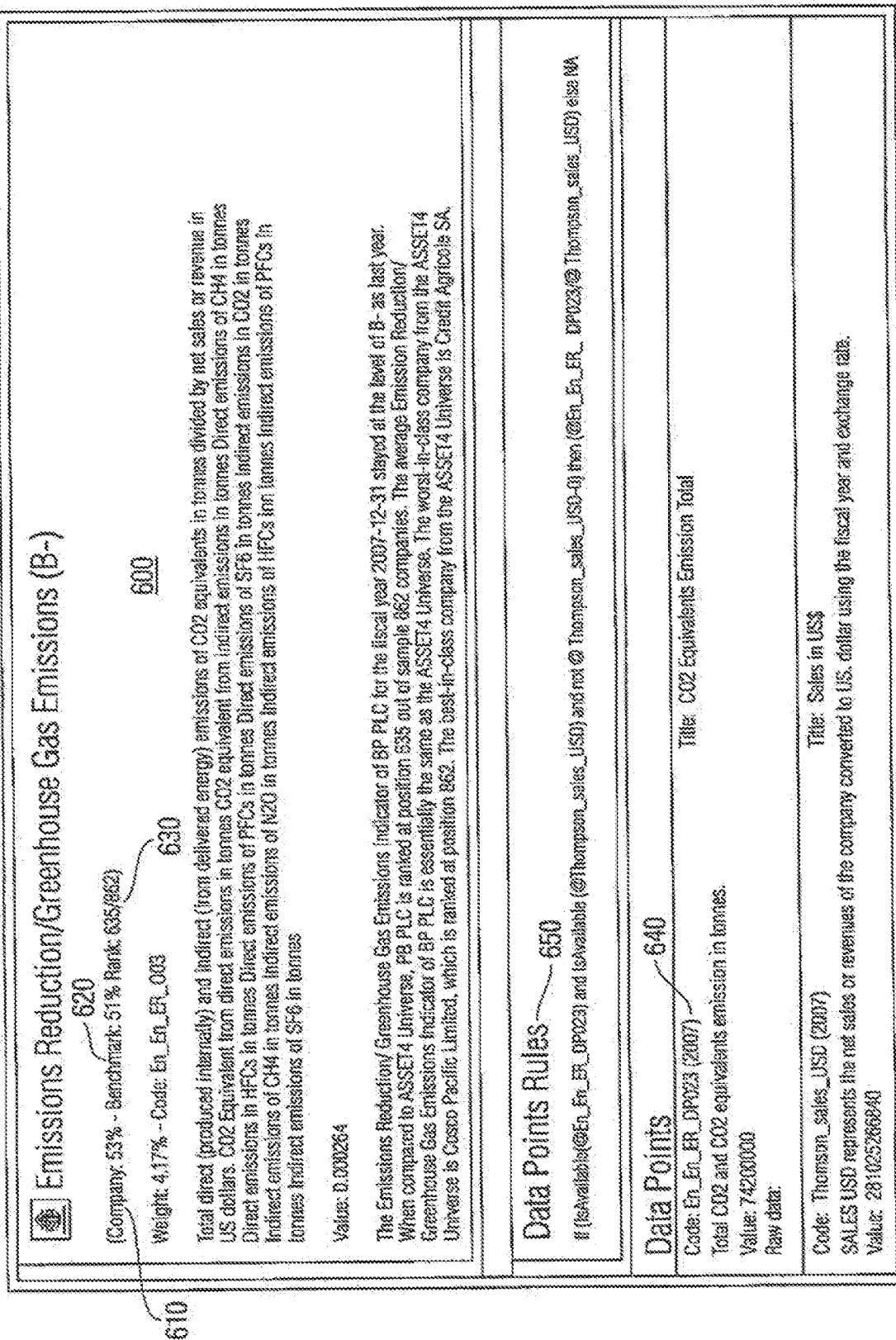
FIG. 6, shows a portion of a user interface that presents details concerning a parameter of a main company under investigation including its value and the basis for its calculation.

FIG. 7 can be part of the user interface of FIG. 6 or a separate page selectable by a user, and provides a link and textual support for the value of the data point.

Figure 8:
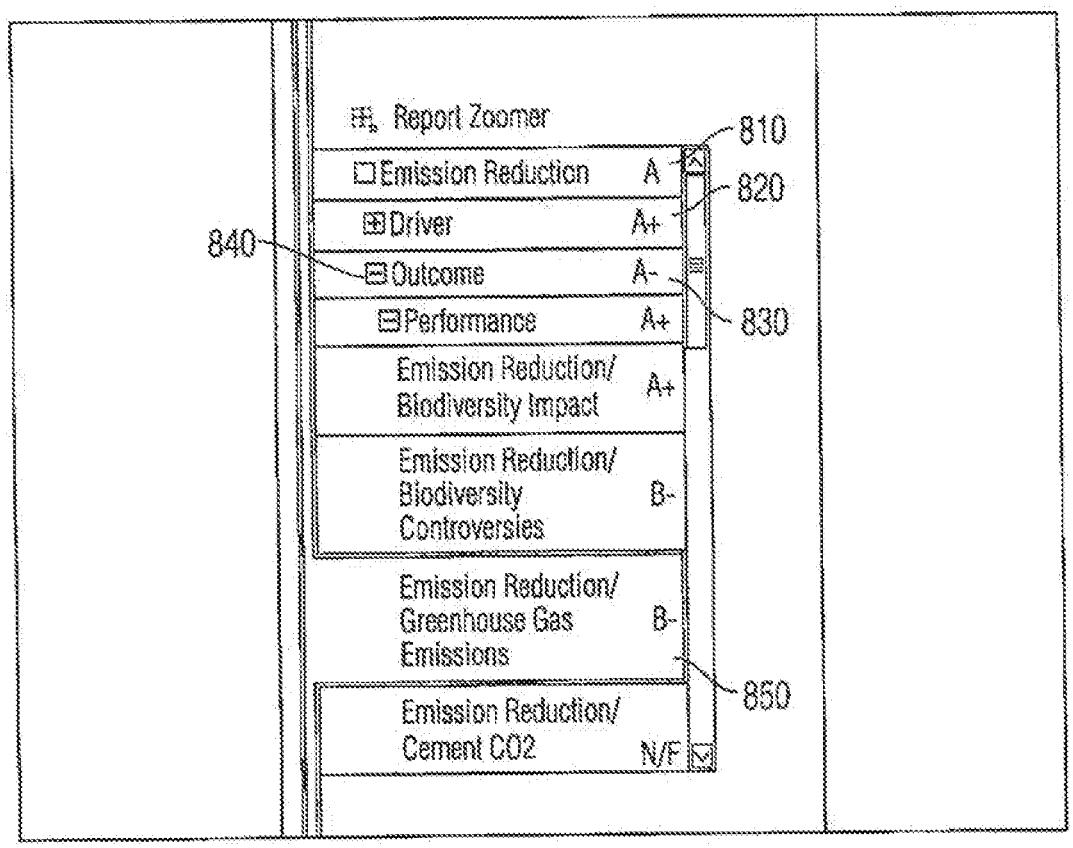

FIG. 8 is a detail view of a further aspect of the user interface, showing ratings at various hierarchical levels starting with a category and delving deeper down to data points of emission reduction (which in this example is an "A" rating), and provides a of a particular outcome, all shown concurrently on the same user-interface display.

DETAILED DESCRIPTION OF CERTAIN EMBODIMENTS OF THE INVENTION

By way of overview and introduction, the total CO2 emission of an entity can be calculated in accordance with a broad aspect of the invention by combining discrete estimates into a total estimate, wherein each discrete estimate concerns a portion of the total estimate and uses a common pool of data concerning the entity, and one of its industry, sub-sector or sector. In one embodiment, carbon estimates are made using four models, if underlying data is available to drive the algorithms used by these models, and no less than two models. Optionally, additional models can be used.

The following discussion is made in regard to the entity being a company of one sort or another, but it will be appreciated that the invention applies to entities of a variety of structures, including without limitation, companies, corporations, limited liability companies, limited liability corporations, partnerships, limited liability partnerships, self-regulated organizations, and joint ventures.

Figure 1:
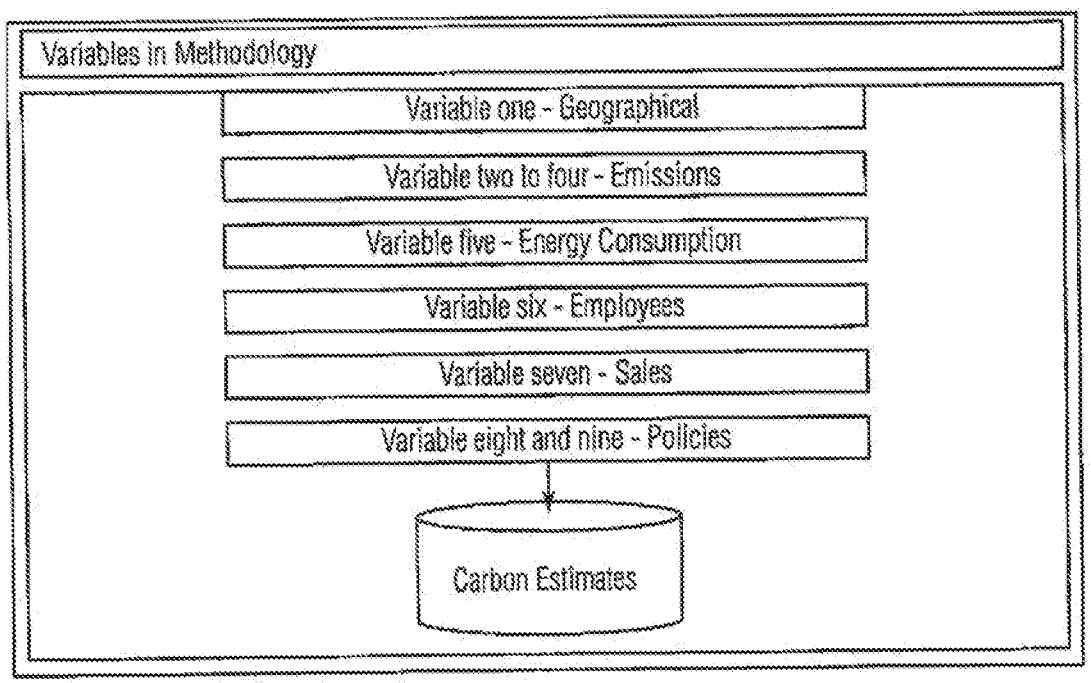
FIG. 1 is a schematic diagram illustrating at a high-level certain variable types that can be used in estimating carbon production by an entity.

The estimates are based on variables that concern the company and an industry, sector, or sub-sector to which the company belongs. The can be both quantitative and qualitative. As shown in FIG. 1, certain variable types that can be used in estimating carbon production by a company, including geographic factors, emissions of various types, energy consumption by the company, the number of employees, sales data for the company and company policies. Each of these data types provide indirect information that are combined by an algorithm, in accordance with the invention, to arrive at several carbon dioxide emission estimates that can be further combined into a total carbon dioxide emission estimate for the company.

Figure 2:
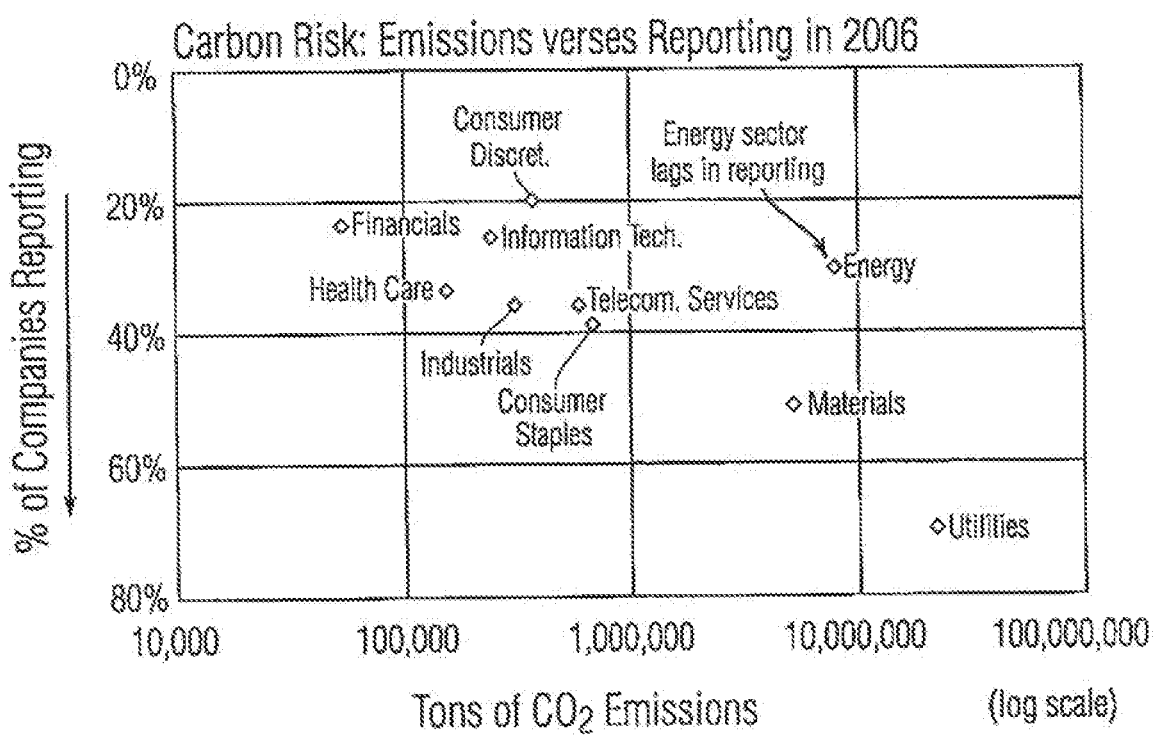
FIG. 2 is a chart showing a general trend of sectors with large carbon emissions having better reporting that sectors with comparatively lower carbon emissions, and further illustrates, for calendar year 2006 data, the percentage of companies reporting by sector.

The estimates are required to properly assess an investment risk in many companies due to incomplete reporting by many companies in many sectors. In some cases, there is no reporting at all which exposes investors and portfolio managers to risks based on uncertainties. In FIG. 2, a chart shows a trend across several sectors (based on data collected for the 2006 calendar year) in which sectors that have large carbon emissions generally have better reporting that sectors with comparatively lower carbon emissions. What can be appreciated, however, is that no sector is complete in reporting its emissions data. The utility sector has the best performance in this regard, at about 70% reporting whereas companies that make consumer discretionary products have the lowest reporting performance.

In order to rate a company on a reasoned basis, data has to be used, whether it is quantitative or qualitative. Incomplete or missing data causes difficulties in comparing companies on a fair basis to each other, to their sector, and so on. One approach has been to assume that if a company is not reporting the data, that the data is bad, but that can is skew a rating calculation and distort a rating that otherwise might have been good. This is particularly true now that the environmental impact of a company is part of an assessment by many investors and managers.

Figure 3:
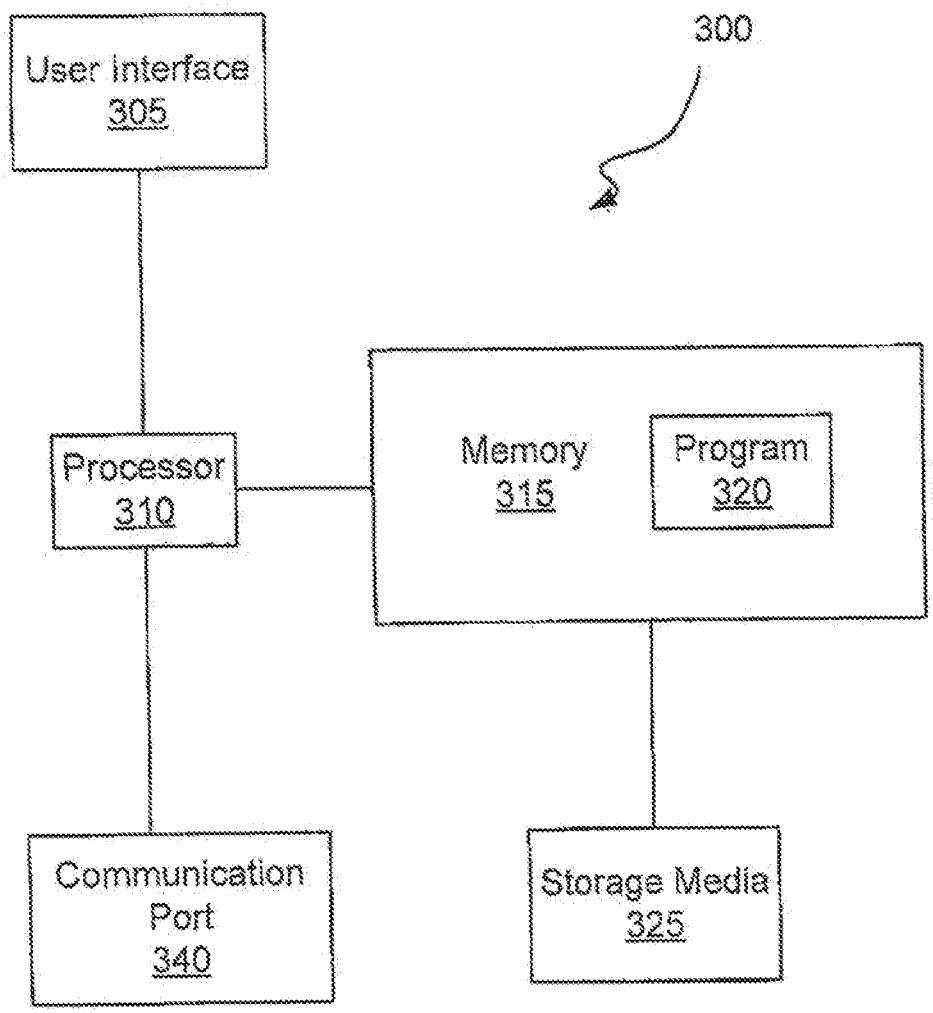
FIG. 3 is block diagram of a computer system 300 configured for employment of a method in accordance with one embodiment of the invention.

Referring briefly now to FIG. 3, a block diagram illustrates a computer system 300 configured for employment of the methods described herein. System 300 includes a user interface 305, a processor 310, and a memory 315. System 300 may be implemented on a general purpose microcomputer, such as one of the members of the Sun® Microsystems family of computer systems, one of the members of the IBM® Personal Computer family, one of the members of the Apple® Computer family, or a myriad other conventional workstation, desktop computer, laptop computer, netbook computer, personal digital assistant, and smart phone devices that are generally available in the marketplace. Although system 300 is represented herein as a standalone system, it is not limited to such, but instead can be coupled to other computer systems via a network (not shown).

Memory 315 is a memory for storing data and instructions suitable for controlling the operation of processor 310. An implementation of memory 315 would include a random access memory (RAM), a hard drive and a read only memory (ROM). One of the components stored in memory 315 is a program 320.

Program 320 includes instructions for controlling processor 310 to execute the methods described herein. Program 320 may be implemented as a single module 322 or as a plurality of modules 322A, 322B, . . . 322N (where N is an arbitrary integer) that operate in cooperation with one another. Program 320 is contemplated as representing a software embodiment of the method described hereinabove.

User interface 305 includes an input device, such as a keyboard, touch screen, tablet, or speech recognition subsystem, for enabling a user to communicate information and command selections to processor 310. User interface 305 also includes an output device such as a display or a printer. In the case of a touch screen, the input and output functions are provided by the same structure. A cursor control such as a mouse, track-ball, or joy stick, allows the user to manipulate a cursor on the display for communicating additional information and command selections to processor 310.

While program 320 is indicated as already loaded into memory 315, it may be configured on a storage media 325 for subsequent loading into memory 315. Storage media 325 can be any conventional storage media such as a magnetic tape, an optical storage media, a compact disc, or a floppy disc. Alternatively, storage media 325 can be a random access memory, or other type of electronic storage, located on a remote storage system.

In operation, the program 320 can take inputs from the memory 315 or from a remote data source. Also, the program can generate outputs through the user interface 305 or to a remote location via a communication port 340. The communication port can exchange messages and data using any number of conventional data transfer schemes and protocols.

Figure 4:
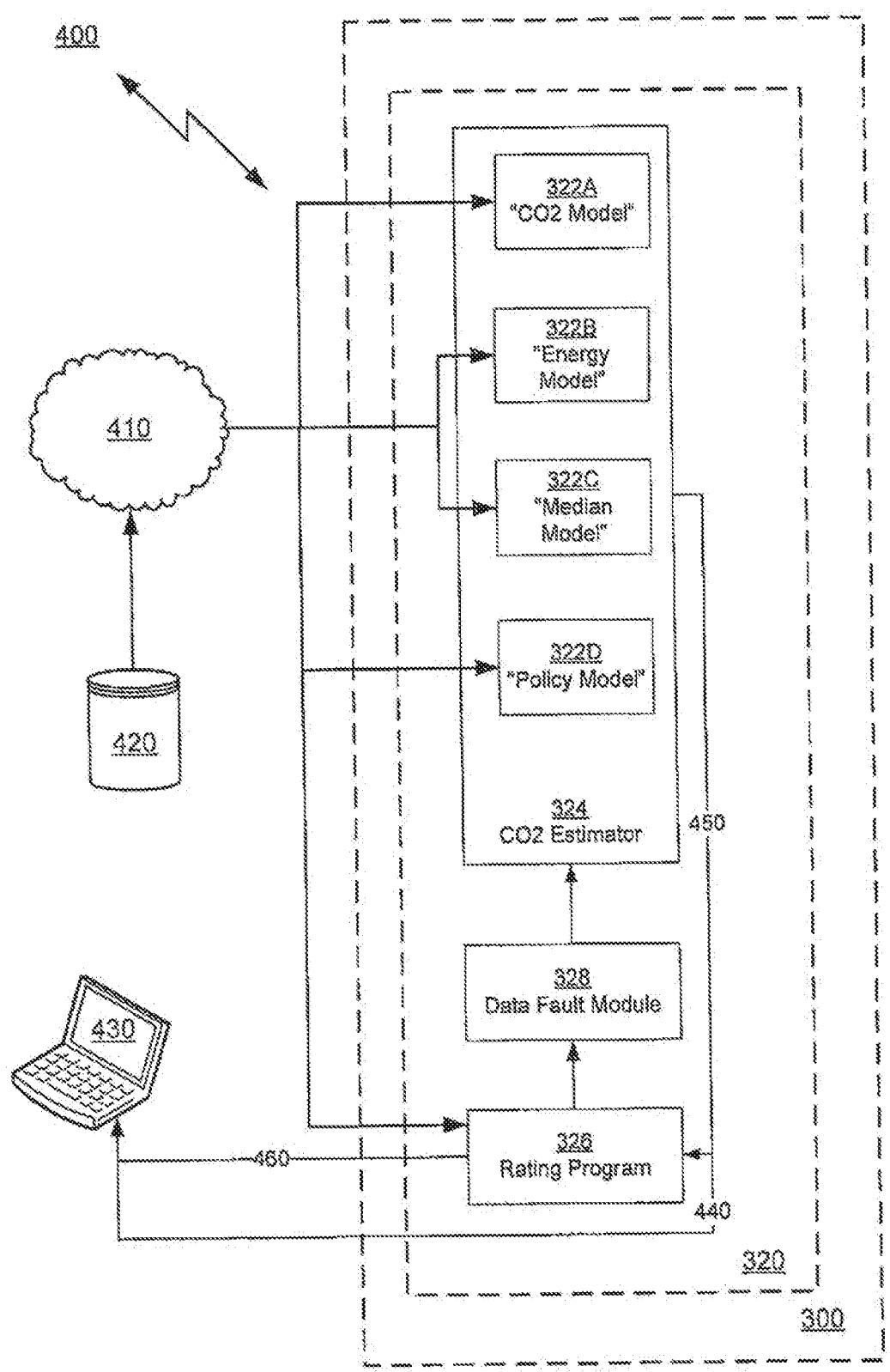
FIG. 4 is a block diagram showing a set of modules that cooperate to selectively provide a carbon dioxide emission estimate to a user or to a rating program.

Referring now to FIG. 4, a system configuration 400 is illustrated in which a plurality of algorithms are each implemented as separate modules 322A, 322B, 322C, and 322D (more generally referred to hereinbelow as modules 322 unless specifics of a particular module are being described), with each module comprising code that executes in the processor 310. The modules 322 are each coupled to one or more data sources across a distributed computer network 410. The various data sources are schematically represented as a single database 420, but it is to be understood that the data can be collected and stored in a single database, or can reside in multiple places that are accessible by the distributed computer network 410.

The modules thus encode heuristics in accordance with different models that can estimate carbon dioxide emissions, and each comprises code in the memory 315 of the machine that has the processor 310. The modules singularly or collectively implement one or more algorithms that transform data received from the data source 420 into an estimate of the carbon dioxide emission of the company under investigation (the "main-company"). A CO2 estimator module 324 includes code for all of the models, though each model can be a separate module 322A-D (as illustrated). The processor executes the code to cause each model to compute an estimate. Each model computes a different component of a total CO2 emission estimate that can be output from the system 300 to a user machine 430 via a communicative connection 440 (e.g., as part of the content of a webpage or other file communicated to the user-machine. For example, a further module can comprise instructions executing in the processor that cause data to be transferred across the communication port 340 so as to output the rating from the machine. The co2 estimator module provides the results as a combined (e.g., a simple average), single output value. Thus, if the models comprise individual modules, the co2 estimator receives their respective outputs and processes that data in order to provide a single output value.

In a preferred mode, the CO2 estimator module 324 operates to complement the operation and output of a rating program 326 (which can be a second module that is part of or distinct from the modules 322), such as described in the aforementioned U.S. Pat. No. 7,277,864, which is hereby incorporated by reference as if set forth in its entirety herein. The value(s) output by the CO2 estimator module 324 can be provided to the rating program 326 via a connection 450. Meanwhile, a data-fault module 328 operates as well to determine circumstances in which a particular company is missing or has incomplete CO2 emission data. The data-fault module causes the single output value of the co2 estimator module 324 to be presented to the user through a user interface at the user-machine 430 when there is missing or incomplete CO2 emission data. Otherwise, the data-fault module will not present estimated values through the interface, and, instead, the reported value for CO2 emission data for the company will be presented. As such, the rating program 326 can identify to the data-fault module 328 situations in which there is missing or incomplete CO2 emission data such that a rating value for a given parameter cannot be calculated. The data-fault module 328 can thereafter instruct the CO2 estimator 324 to provide or both compute and provide an estimated carbon dioxide emission value to the rating program over line 450. The rating program 326 can then compute a rating of the company using the value supplied by the CO2 estimator 324 rather than make assumptions or fail due to the absence of or incomplete data.

It should be appreciated that the data-fault module 328 can be incorporated into the rating program 326, and that the CO2 estimator 324 and any associated modules can be incorporated in the rating program as variations within the scope of a code-driven embodiment.

With further reference now to the modules in FIG. 4, the CO2 estimator 324 is illustrated as having four models encoded in respective modules: a "CO2 model" within module 322A, an "Energy model" within module 322B, a "Median model" within module 322C, and a "Policy model" within module 322D. Each model returns one estimate, making a total of four estimate numbers provided to the CO2 estimator 324. Not all are expected to provide the same accuracy, and the following order should be but is not required to be respected. In particular, the "CO2" model should be used if available as it provides "derived data." Otherwise, and if available, the "Energy" model should be used as it also provides "derived data." Next, otherwise, the "Median" model should be used as it provides "estimated data," potentially together with the "Policy model" as it provides an "adjustment."

Any error associated with a particular model can be estimated by taking, for example, ten companies for which the data source 420 provides the total CO2 emissions, and by then applying each model/module 322 as if the total CO2 emissions were not known. The difference between the estimate and the reported number provides an idea of the error associated to the model. Preferably, the benchmarks used for computing the error are for companies having known total CO2 emissions that are in the same industry, sector or subsector as the company whose CO2 emission is being estimated.

Module 322A includes instructions that implement a "CO2 model." The heuristics of this module are configured to provide a value that is part of the estimate for the total CO2 emissions of a company of interest. In particular, the instructions obtain, such as by a query of the data source 420 via the communication port 340, the latest available total CO2 emission for the company. For instance, this may be from the previous calendar year, or from years ago, etc. This value is divided by the number of employees that the company had during the same year as the latest available total CO2 emission number. This provides a normalized value of emissions per employee. Next, the normalized value is multiplied by the number of employees of the company during the year in which we are calculating the CO2 emission estimate. In similar manner, the total CO2 emission number for the company is divided by the net sales figure reported by that company, in original currency, to provide a normalized value of emissions per net sales which is then multiplied by the same net sales figure of the company for the year in which we are calculating the CO2 emission estimate. The estimate provided from this heuristic approach can be the average of the two numbers calculated as the CO2 emission estimate, or can comprise one of these two numbers if the other cannot be calculated (e.g., if employee numbers are not reported, then the estimate provided by this module can comprise the number calculated using only net sales data).

By the CO2 model, the working assumption is that the magnitude of sales or employees bears a direct relationship to the CO2 emission value, such that a new estimate for CO2 emission in a given year can be "derived" from a known value in a prior year.

Module 322B includes instructions that implement an "energy model." The heuristics of this module are configured to provide a value that is part of the estimate for the total CO2 emissions of a company of interest, and like module 322A, derives an estimate from known values in prior years. In particular, the instructions obtain, such as by a query of the data source 420 via the communication port 340, the latest available total energy purchase by the company in support of its operations. For instance, this may be from the previous calendar year, or from years ago, etc. Note that for companies in the utility sector, the total energy sold is the metric to identify and use. This value is divided by the number of employees that the company had during the same year as the latest available total energy purchase number. This provides a normalized value of total energy purchased (or sold, in the case of utilities) per employee for the main-company whose $CO_2$ emission is to be estimated. Next, the same normalized values (ratios) are computed for all the other companies in the same industry (e.g., using 6 GICS digits) as the main-company, using total energy purchase data obtained from the data source 420, as described above. If the number of available ratios is smaller than 10, then the set of companies should be extended to the sub-sector (4 GICS digits). If the number of available ratios is still smaller than 10, then the set of companies should be extended to the sector (2 GICS digits). The reason for this is to provide a set of ratios for use in the next algorithmic step.

The algorithm continues by computing the percentile rank of the normalized value for the main-company within and among the ratios for the other companies whose normalized values were computed. (i.e., for the other companies in the same industry, sector or subsector), referred to herein as the "comparison class." Each member of the comparison class must have a known total $CO_2$ emission for the latest available year being analyzed for the main-company, as will be appreciated from the subsequent steps performed by the algorithm. In any event, as a result of this step, the algorithm identifies a rank-position of the main company relative to the comparison class.

Next, the total $CO_2$ emissions output of the comparison class members is divided by the number of employees to obtain a $CO_2$ emission per employee value for the companies in the comparison class. These results are ranked and the rank-position of the main-company is used to select a $CO_2$ emission per employee value of the company that matches the main-company's rank-position that was calculated in terms of energy purchased (or sold). This figure is multiplied by the number of employees of the main-company to provide a first (or only) component in the $CO_2$ estimate output by this module 322B.

The foregoing steps can then be repeated using net sales, in original currency, instead of number of employees to arrive at a similar figure that is defined in terms of net sales rather than in terms per employee. Specifically, the total energy purchased by the main-company is divided by the net sales number for the latest-year having available data. The same metric is computed for each member of the comparison class. The main-company's rank-position is determined in terms of its total energy usage, and then that rank-position is used to select a company in the comparison class that has been ranked in terms of its $CO_2$ emission per employee. The company so-selected has its $CO_2$ emission per employee multiplied by the number of employees of the main-company to provide a second (or only) component in the $CO_2$ estimate output by this module 322B.

The estimate output by the module 322B using the energy model can be the average of the components mentioned above, or can be the value of either component, but in either case is a derived value based on the assumption that energy purchases by a company can be correlated in comparison to companies in a comparison class with the $CO_2$ emission amount of companies in the comparison class, such that a new estimate for $CO_2$ emission in a given year can be "derived" from a known value of a comparison-class company in a prior year.

Module 322C includes instructions that implement a "median model." The heuristics of this module are configured to provide a value that is part of the estimate for the total $CO_2$ emissions of a company of interest. In particular, the instructions obtain, such as by a query of the data source 420 via the communication port 340, of the total $CO_2$ emission for the comparison class to the main-company for the same year that we are to compute a total $CO_2$ estimate for the main-company. This data for each of the comparison-class members is divided by the number of employees of such companies (also obtained from the data source 420) to obtain a $CO_2$ emission per employee value for the comparison-class companies. The algorithm then computes a median value for the comparison class. The median value is multiplied by the number of employees of the main-company for the same year in question to provide a first (or only) component in the $CO_2$ estimate output by this module 322C. For the same year in question, the $CO_2$ emissions for the comparison class is divided by their respective net sales (in original currency; obtained from the data source 420) to obtain a $CO_2$ emission per net sales value for the comparison-class companies. The algorithm then computes a median value for the comparison class using this metric. The median value is multiplied by the net sales number of the main-company for the same year in question to provide a second (or only) component in the $CO_2$ estimate output by this module 322C.

The estimate output by the module 322C using the median calculation can be the average of the components mentioned above, or can be the value of either component, but in either case is an estimated value based on a median calculation of $CO_2$ emission among the comparison-class companies and the assumption that the main-company's emission can be estimated in view of that figure.

Next, module 322D includes instructions that implement a "policy model" using heuristics configured to provide a value that is part of the estimate for the total $CO_2$ emissions of a company of interest. The policy module obtains from the data source 420 information sufficient to answer the following policy-questions for the main-company and for the comparison-class companies:

| Policy Question | Parameter for Algorithmic Processing |
| --- | --- |
| Does the company have a policy to improve its energy efficiency? | En_En_RR_DP001[2] |
| Has there been a public commitment from a senior management or board member to energy efficiency? | En_En_RR_DP003[2] |
| Does the company describe, claim to have or mention processes in place to improve its energy efficiency? | En_En_RR_DP012[2] |
| Does the company claim to use key performance indicators (KPI) or the balanced scorecard to monitor energy efficiency? | En_En_RR_DP013[2] |
| Does the company show through the use of surveys or measurements that it is improving its energy efficiency? | En_En_RR_DP015[2] |
| Has the company set targets or objectives to be achieved on energy efficiency? | En_En_RR_DP019[2] |
| Is the company making progress or succeeding to achieve its previously set objectives on energy efficiency? | En_En_RR_DP020[2] |
| Does the company have a policy to reduce emissions? | En_En_ER_DP001[1] |
| Has there been a public commitment from a senior management or board member to emission reduction? | En_En_ER_DP003[1] |

-continued

| Policy Question | Parameter for Algorithmic Processing |
|---|---|
| Does the company describe, claim to have or mention processes in place to improve emission reduction | En_En_ER_DP005[1] |
| Does the company claim to use key performance indicators (KPI) or the balanced scorecard to monitor emission reduction? | En_En_ER_DP010[1] |
| Does the company show through the use of surveys or measurements that it is reducing its emissions? | En_En_ER_DP012[1] |
| Has the company set targets or objectives to be achieved on emission reduction? | En_En_ER_DP016[1] |
| Is the company making progress or succeeding to achieve its previously set objectives on emission reduction? | En_En_ER_DP017[1] |
| Does the company make direct use of renewable energy? | En_En_RR_DP045 |

More specifically, the algorithm encoded in module 322D determines how many of the policies noted above can be answered yes for the main-company and for the comparison-class companies. Next, the algorithm encoded in module 322D finds the percentile rank of the main-company relative to the comparison-class companies using the determination just made regarding the policies. If the main-company is ranked less than the 25% percentile, then the module 322D outputs a weighting or other factor to increase the estimate produced by the "median model" of module 322C by 25%. On the other hand, if the main-company is ranked greater than the 25% percentile, then the module 322D outputs a weighting or other factor to decrease the estimate produced by the "median model" of module 322C by 25%.

Figure 5:
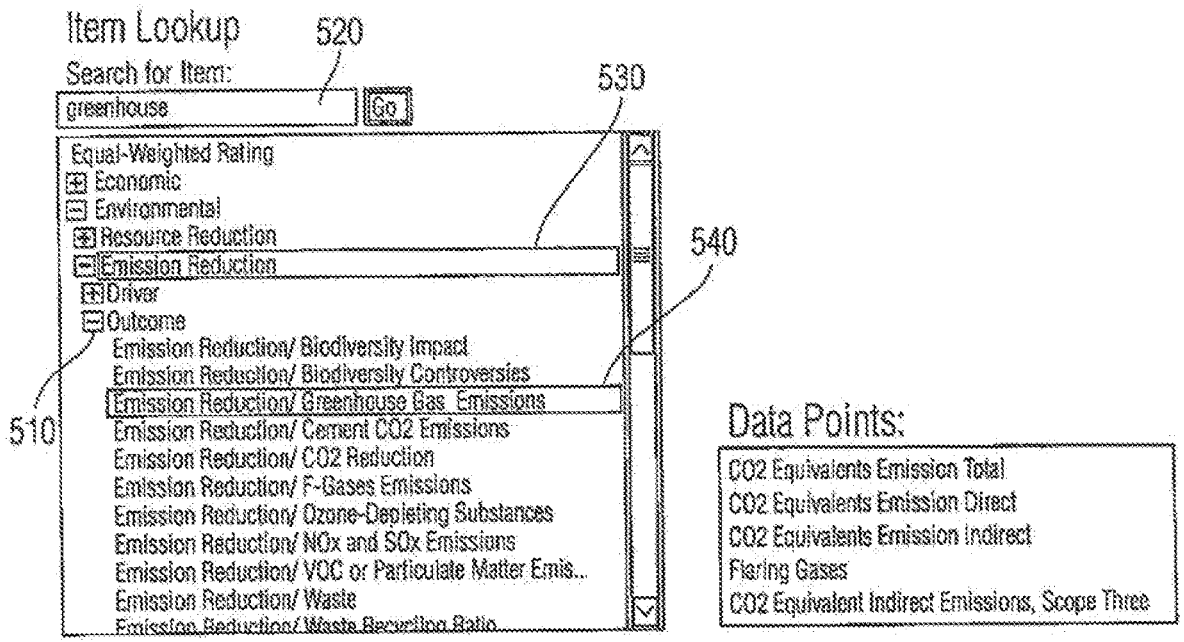
FIGS. 5A, 5B and 5C show a portion of a user-interface associated with a rating program as may be seen by a user.

Referring now to FIGS. 5A-5C, a portion of a user-interface 500 associated with the rating program 326 is illustrated as may be seen on the user-machine 430 is illustrated in three parts for discussion, though in an implementation the UI 500, each of FIGS. 5A-5C can be displayed in a common window. By interacting with the user-interface 500, such as using a conventional mouse device or other navigation tool, a user can manually drill-down to expose factors that bear on a rating of the main-company such as by click-selecting a control such as outcome collapse/expand control 510 (shown in the expanded state). In like manner, the user can click-select to open and inspect drivers. For an explanation of drivers and outcomes as they relate to rating companies, reference is made to the aforementioned U.S. patent that has been incorporated by reference. In FIG. 5, the outcomes that are available for inspection are associated with the category of "emission reduction" and are one of several categories under the pillar of "environmental" factors. On the other hand, a user can submit via a form 520 and search for a particular pillar, category, driver, or outcome. Once a parameter of interest is selected, the middle section of the UI 500 (FIG. 5B) shows the data points whose values affect the main-company's rating. The right section of the UI 500 (FIG. SC) defines each data point and reveals the name of the parameter used for algorithmic processing. Depending on the implementation, the rating program or system may or may not permit users to inspect down to the data point level. For instance, permission to inspect and or change the weightings, parameters relied upon or the algorithm itself can be based on whether the end user is a subscriber to the system 300 or not. For more information on access to multiple tiers of data, reference is made to U.S. patent application Ser. No. 11/071,981, filed on Mar. 3, 2005, entitled Tiered Access To Integrated Rating System, which is hereby incorporated by reference as if set forth in its entirety herein.

In FIG. 5, the user has entered greenhouse gases as the search term in form 520 and that causes the emission reduction tab 530 to be highlighted as well as the leaf 540 which is the specific outcome parameter relating to emission reduction/greenhouse gas emissions. FIG. 6, shows a detail page 600 of a user interface for a company (British Petroleum PLC) including its rating 610, its standing compared to a benchmark 620, and its rank 630. The data points 640 that govern the value of the parameter (in this example, a "B−"), and the rules 650 that define the calculation of the greenhouse gas emissions.

FIG. 7 illustrates further information that can be provided through the UI, such as at page 600 by scrolling downward, and illustrates the underlying source document information including a link (e.g., a URL or hypertext link) to the source of the particular data point for that parameter, and also textual documentation in support of the value of that parameter.

FIG. 8 illustrates the overall rating accorded to the category of emission reduction (which in this example is an "A" rating), and provides a breakdown of the ratings accorded to the drivers 820 and outcomes 830. The outcome control 840 has been expanded to expose the individual parameters such as greenhouse gas emissions 850, and the rating for British Petroleum ("B−") is shown highlighted to the user via the user interface.

In operation, code executing in the machine that comprises the data-fault module 328 has access to the foregoing data and modules 322 (or to the output of the modules 322) and tests to determine if there is a value available on the basis of reported data. For instance, equation (1) below causes the reported value to be displayed through a user interface on the user machine 430 if data is available both from the records of the company under inspection (e.g., British Petroleum) and if third-party reported data is available and shows a non-zero sales figure. In that case, the value is normalized to the sales figure.

if (isAvailable(@En_En_ER_DP023) and isAvailable(@Thomson_sales_USD) and
not@Thomson_sales_USD=0)  (1)

then (@En_En_ER_DP023/@Thomson_sales_USD)  (1)

The data-fault module can output the reported value in this instance. However, if the test performed is not satisfied, then the data-fault module will further process the data, such as using equation (2) below to cause a CO2 total emission estimate to be populated in the database and presented through the user interface. An exemplary fault condition can process the information as follows:

else if (isAvailable(@En_En_ER_DPNNN) and isAvailable(@Thomson_sales_USD) and
not@Thomson_sales_USD=0)  (2)

then (@En_En_ER_DPNNN/@Thomson_sales_USD)  (2)

In some situations, however, there may not be reported value or available third-party revenue information. In that circumstance, further processing by the data-fault module can be by code operative as follows:

else NA  (3)

The present invention addresses the risks that investors are exposed to due to CO2 emissions by companies in their portfolios. The modules described herein operate within a rating system or in conjunction with a rating program 326 as in the aforementioned patent to provide institutional investors with a tool through which they can assess the carbon risk for companies within a portfolio, even in circumstances in which some of the data is incomplete or unreported. The modules use a diverse range of qualitative and quantitative sector based factors to arrive at values that are reliable and that can have any error associated with the individual models accounted for. By correcting for such errors at the model-level, the module(s) operate collectively to provide an optimized routine for automated data estimation in the absence of reported values. The estimates are fully transparent and enable clients to customize and create their own estimate models.

While the invention has been described in connection with a certain embodiment thereof, the invention is not limited to the described embodiments but rather is more broadly defined by the recitations in the claims below and equivalents thereof.

We claim:

1. A system comprising:
   at least one estimation module of a machine having a processor and a memory, said estimation module configured to compute, using incomplete data relating to an environmental factor for an entity, at least one component of an estimate of the environmental factor, wherein the computing is performed by applying a heuristic model algorithm associated with the at least one estimation module to the incomplete data, wherein the at least one estimation module is one of a plurality of estimation modules, each estimation module of the plurality of estimation modules being associated with a respective model algorithm for computing a respective component of the at least one component of the estimate;
   wherein the processor is further configured to generate a rating of the entity based on the estimate, wherein the generating includes applying the estimate as a factor in a formula to generate the rating for the entity; and
   wherein the machine is further configured to output the rating.

2. A system as in claim 1, wherein the processor of the machine is further configured to:
   receive data relating to an industry, sector, or sub-sector to which the entity belongs, wherein the data relating to the industry, sector, or sub-sector includes the data relating to the environmental factor;
   determine by the processor one or more circumstances in which the data relating to the environmental factor for the entity is at least one of missing and incomplete, wherein the at least one estimation module includes a plurality of estimation modules, and wherein each estimation module of the plurality of estimation modules encodes a respective heuristic model algorithm; and
   compute, by each estimation module of the plurality of estimation modules, using the respective heuristic model algorithm, a different component of the estimate of the environmental factor of the entity.

3. A system as in claim 2, wherein the computing by each estimation module of the plurality of estimation modules, the different component of the estimate of the environmental factor of the entity is configured to be performed in parallel.

4. A system as in claim 2, wherein the processor of the machine is further configured to combine the results of the plurality of estimation modules.

5. A system as in claim 4, wherein the combining the results of the plurality of estimation modules includes computing a simple average that is provided as the environmental factor in the form of a single value.

6. A system as in claim 2, wherein the respective heuristic model algorithms have a hierarchical accuracy order, and wherein the processor is configured to implement the computing, by each estimation module of the plurality of estimation modules, of the different components of the estimate in accordance with the hierarchical accuracy order.

7. A system as in claim 2, wherein the processor of the machine is further configured to:
   compute an error associated with each respective heuristic model algorithm by applying each respective heuristic model algorithm to at least one additional entity having a known value concerning the environmental factor; and
   calculate a difference between the estimate for the additional entity concerning the environmental factor and the known value.

8. A system as in claim 7, wherein the processor of the machine is further configured to correct for any calculated difference concerning the additional entity so as to account for such error in the estimate for the entity.

9. A system as in claim 1, wherein the processor of the machine is further configured to output the estimate to a user through a user interface.

10. A system as in claim 9, wherein the output of the estimate is configured to be selectively enabled based upon operation of a data-fault module executing in the machine, the data-fault module being operative to configure the processor to output the estimate if the entity is determined to have missing or incomplete data concerning the environmental factor.

11. A system as in claim 1, wherein the processor of the machine is further configured to, as a threshold step, determine via a data-fault module executing in the machine, whether the entity has missing or incomplete data relating to the environmental factor for the entity, and perform the remaining steps if the entity is determined to have missing or incomplete data relating to the environmental factor for the entity.

12. A system as in claim 2, wherein the processor of the machine is further configured to:
   provide a user interface to the machine; and
   permit users, through the user-interface, to customize at least one of the respective heuristic model algorithms.

13. A system as in claim 1, wherein the entity is selected from the group consisting essentially of a company, a corporation, a limited liability company, a limited liability corporation, a partnership, a limited liability partnership, a self-regulated organization, and a joint venture.

14. An apparatus a machine having at least one processor and a memory, said apparatus comprising:
   at least one estimation module, said estimation module configured to calculate using incomplete data relating to an environmental factor for an entity, at least one component of an estimate of the environmental factor, wherein the computing is performed by applying a heuristic model algorithm associated with the at least one estimation module to the incomplete data, wherein the at least one estimation module is one of a plurality of estimation modules, each estimation module of the plurality of estimation modules being associated with a respective model algorithm for computing a respective component of the at least one component of the estimate;

wherein the at least one processor is further configured to:
estimate the environmental factor of the entity based on the at least one component of the estimate computed by the at least one estimation module; and
output the estimate from the machine.

15. A apparatus as in claim 14, wherein the at least one processor is further configured to:
receive, at the machine, data relating to an industry, sector, or sub-sector to which the entity belongs, wherein the data relating to the industry, sector, or sub-sector includes the data relating to the environmental factor;
determine one or more circumstances in which the data relating to the environmental factor for the entity is at least one of missing and incomplete, wherein the at least one estimation module includes a plurality of estimation modules, and wherein each estimation module of the plurality of estimation modules encodes a respective heuristic model algorithm; and
compute, utilizing each estimation module of the plurality of estimation modules, using the respective heuristic model algorithm, a different component of the estimate of the environmental factor of the entity.

16. A apparatus as in claim 15, wherein the computing, by each estimation module of the plurality of estimation modules, the different component of the estimate of the environmental factor of the entity is performed in parallel.

17. A apparatus as in claim 15, wherein the at least one processor is further configured to combine the results of the plurality of estimation modules, wherein the combining the results of the plurality of estimation modules includes computing a simple average that is provided as the environmental factor in the form of a single value.

18. A apparatus as in claim 15, wherein the at least one processor is further configured to:
compute an error associated with each respective heuristic model algorithm by applying each respective heuristic model algorithm to at least one additional entity having a known value concerning the environmental factor;
calculate a difference between the estimate for the additional entity concerning the environmental factor and the known value; and
correct for any calculated difference concerning the additional entity so as to account for such error in the estimate for the entity.

19. A apparatus as in claim 14, wherein the at least one processor is further configured to make the estimate available to a user through a user interface.

20. A apparatus as in claim 19, wherein making the estimate available to a user is selectively enabled based upon operation of a data-fault module executing in the machine, the data-fault module being operative to configure the processor to enable the making step if the entity is determined to have missing or incomplete data concerning the environmental factor.

* * * * *